(12) United States Patent
Church

(10) Patent No.: US 6,248,701 B1
(45) Date of Patent: *Jun. 19, 2001

(54) AQUEOUS METAL COATING COMPOSITION AND PROCESS WITH REDUCED STAINING AND CORROSION

(75) Inventor: Richard J. Church, Madison Heights, MI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/652,141

(22) Filed: May 23, 1996

Related U.S. Application Data

(63) Continuation of application No. 08/242,530, filed on May 13, 1994, now abandoned.

(51) Int. Cl.$^7$ .......................... C10M 173/00; C23F 11/00
(52) U.S. Cl. .................. 508/158; 508/507; 252/389.2; 252/389.4; 252/389.54; 252/391; 524/83; 524/91; 106/14.12; 106/14.16; 106/14.17; 106/14.42
(58) Field of Search ............... 106/14.11, 14.12, 106/14.13, 14.41, 14.42, 14.5, 14.17, 14.21, 14.16; 252/389.2, 389.4, 389.54, 390, 391; 422/7; 508/158, 507; 524/83, 91

(56) References Cited

U.S. PATENT DOCUMENTS

| | | | |
|---|---|---|---|
| 2,469,473 | 5/1949 | Orozco et al. | 205/21 |
| 2,595,140 * | 4/1952 | Heinrich | 252/50 |
| 2,864,676 * | 12/1958 | Thomas | 252/50 |
| 2,890,170 * | 6/1959 | Ragborg | 252/50 |
| 2,977,334 * | 3/1961 | Zopf | 252/56 D |
| 3,245,915 * | 4/1966 | Rai et al. | 252/51 |
| 3,265,620 * | 8/1966 | Heiman | 252/50 |
| 3,313,728 | 4/1967 | Glasson et al. | 252/18 |
| 3,455,132 * | 7/1969 | Henderson | 72/42 |
| 3,527,726 * | 9/1970 | Gower et al. | 524/549 |
| 3,568,486 * | 3/1971 | Rosenberg et al. | 72/42 |
| 3,597,353 * | 8/1971 | Randell et al. | 252/50 |
| 3,625,894 * | 12/1971 | Koenig et al. | 252/50 |
| 3,629,112 * | 12/1971 | Gower et al. | 252/34.7 |
| 3,637,498 | 1/1972 | Sawyer | 252/30 |
| 3,645,897 * | 2/1972 | Gower et al. | 252/34.7 |
| 3,657,123 * | 4/1972 | Stram | 252/34.7 |
| 3,697,427 * | 10/1972 | Byford et al. | 252/50 |
| 3,741,897 | 6/1973 | Gansheimer et al. | 252/25 |
| 3,775,321 * | 11/1973 | Turnquest et al. | 252/50 |
| 3,849,433 * | 11/1974 | Butula et al. | 252/50 |
| 3,873,374 | 3/1975 | Kolts | 148/12.1 |
| 3,873,458 * | 3/1975 | Parkinson | 252/49.5 |
| 3,923,673 * | 12/1975 | Van Henten et al. | 72/42 |
| 4,098,720 * | 7/1978 | Hwa | 252/389.3 |
| 4,116,872 | 9/1978 | Jahnke | 252/32.7 |
| 4,138,346 * | 2/1979 | Nassry et al. | 252/32.5 |
| 4,144,180 * | 3/1979 | Andress, Jr. | 252/50 |
| 4,146,488 | 3/1979 | Martin | 252/34.7 |
| 4,149,969 | 4/1979 | Robitaille et al. | 252/181 |
| 4,162,225 * | 7/1979 | Braid | 252/50 |
| 4,171,272 * | 10/1979 | Wright | 252/50 |
| 4,197,210 * | 4/1980 | Bridger | 252/50 |
| 4,219,433 | 8/1980 | Manabe et al. | 252/75 |
| 4,278,553 * | 7/1981 | Sung et al. | 252/50 |
| 4,283,296 * | 8/1981 | Nebzydoski et al. | 252/50 |
| 4,285,823 * | 8/1981 | Sung et al. | 252/50 |
| 4,301,019 * | 11/1981 | Horodysky et al. | 252/49.6 |
| 4,324,671 | 4/1982 | Christian et al. | 252/49.6 |
| 4,392,968 * | 7/1983 | Ishida et al. | 252/50 |
| 4,403,490 | 9/1983 | Sargent | 72/42 |
| 4,410,436 * | 10/1983 | Holstedt et al. | 252/49.6 |
| 4,412,928 * | 11/1983 | Holstedt et al. | 252/49.6 |
| 4,416,132 | 11/1983 | Sargent | 72/41 |
| 4,464,276 * | 8/1984 | Sung et al. | 252/50 |
| 4,466,894 * | 8/1984 | Grover | 252/50 |
| 4,519,928 * | 5/1985 | Braid | 252/50 |
| 4,545,925 * | 10/1985 | Bosen et al. | 252/389.21 |
| 4,548,787 * | 10/1985 | Wilson et al. | 422/15 |
| 4,622,158 * | 11/1986 | Walsh | 252/49.3 |
| 4,623,474 | 11/1986 | Holstedt et al. | 252/47.5 |
| 4,659,492 * | 4/1987 | Jahnke | 252/49.3 |
| 4,663,061 * | 5/1987 | Kuwamoto et al. | 252/45 |
| 4,675,158 | 6/1987 | Klindera | 422/16 |
| 4,708,810 * | 11/1987 | Askew et al. | 252/51 |
| 4,800,033 * | 1/1989 | Stetter | 252/55 |
| 4,818,777 * | 4/1989 | Braig | 524/83 |
| 4,822,507 * | 4/1989 | Kanamori et al. | 252/45 |
| 4,828,731 * | 5/1989 | Katafuchi | 252/45 |
| 4,853,139 * | 8/1989 | Ichihashi | 252/49.6 |
| 4,863,623 * | 9/1989 | Nalesnik | 252/50 |
| 4,871,465 * | 10/1989 | Hutchison | 252/45 |
| 4,992,212 * | 2/1991 | Corring et al. | 510/255 |
| 5,075,383 * | 12/1991 | Migdol et al. | 252/51 |
| 5,085,696 * | 2/1992 | Muller et al. | 106/14.16 |
| 5,108,629 * | 4/1992 | Matsuda et al. | 252/49.3 |
| 5,116,521 * | 5/1992 | Fujii et al. | 252/18 |
| 5,128,065 | 7/1992 | Hollander | 252/394 |
| 5,141,675 * | 8/1992 | Vanderpool et al. | 252/389.23 |

(List continued on next page.)

FOREIGN PATENT DOCUMENTS

| | | | |
|---|---|---|---|
| WO96/07722 | 3/1996 | (WO) | 173/2 |
| WO96/24653 | 8/1996 | (WO) | 173/2 |

OTHER PUBLICATIONS

Unithox® Ethoxylated Alcohols, Tulsa, OK, Technical Release 4001.0, (9/88).

* cited by examiner

Primary Examiner—Richard D. Lovering
Assistant Examiner—Daniel S. Metzmaier
(74) Attorney, Agent, or Firm—Wayne C. Jaeschke; Stephen D. Harper; Wayne C. Jaeschke, Jr.

(57) ABSTRACT

A combination of sulfur-free azoles, preferably benzotriazole and tolyltriazole, with sulfur-containing azoles, preferably 2-mercaptobenzothiazole or mercaptobenzimidazole, prevents discoloration, staining, or corrosion of metal surfaces being coated with an organic protective coating from aqueous dispersion or solution.

18 Claims, No Drawings

U.S. PATENT DOCUMENTS

| | | | |
|---|---|---|---|
| 5,143,634 | * 9/1992 | Quinga et al. | 252/50 |
| 5,156,769 | 10/1992 | Cha et al. | 252/395 |
| 5,217,686 | 6/1993 | Vanderpool et al. | 422/16 |
| 5,232,615 | * 8/1993 | Patil et al. | 252/51 |
| 5,236,626 | 8/1993 | Vanderpool et al. | 252/394 |
| 5,271,856 | * 12/1993 | Patil et al. | 252/51 |
| 5,334,319 | * 8/1994 | Tomizawa et al. | 252/49.6 |
| 5,368,757 | * 11/1994 | King | 252/34 |
| 5,399,274 | * 3/1995 | Marcus | 252/49.3 |
| 5,531,912 | * 7/1996 | Church et al. | 508/307 |
| 5,547,595 | * 8/1996 | Hacias | 508/156 |

AQUEOUS METAL COATING COMPOSITION AND PROCESS WITH REDUCED STAINING AND CORROSION

This is a continuation of application Ser. No. 08/242,530 filed May 13, 1994, now abandoned.

BACKGROUND OF THE INVENTION

1. Field of the Invention

This invention relates to aqueous liquid compositions suitable for forming a protective coating containing an organic binder material on metal surfaces that are contacted with the compositions, either by direct deposition of a protective film on the metal while the liquid composition is in contact with the metal, or, more commonly, by depositing a liquid film of the liquid composition on the metal and converting this liquid film to a protective solid film by removing water from the initially deposited liquid film and, optionally, heating or otherwise causing the solid constituents of the liquid film to coalesce and/or react, so as to produce an adherent solid film on the metal surface. The solid film thus deposited may be protective against corrosion, damage during cold working of the underlying metal, or the like. The metal surfaces processed as described above may or may not have other surface layers, such as phosphate or chromate conversion coatings, coatings formed by anodization, or the like, underlying the coating produced on the surface by using this invention.

2. Statement of Related Art

Many aqueous liquid compositions that deposit protective coatings on metal surfaces are known. Little prior attention appears to have been paid, however, to the potential of such aqueous liquid compositions for damaging, during treatment, the surfaces that they are intended to protect.

DESCRIPTION OF THE INVENTION

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the umerical limits stated is generally preferred. Also, unless expressly stated to the contrary: percent, "parts of", and ratio values are by weight; the term "polymer" includes oligomer; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarILy preclude chemical interactions among the constituents of a mixture once mixed; specification of materials in ionic form implies the presence of sufficient counterions to produce electrical neutrality for the composition as a whole (any counterions thus implicitly specified should preferably be selected from among other constituents explicitly specified in ionic form, to the extent possible; otherwise such counterions may be freely selected, except for avoiding counterions that act adversely to the objects of the invention); and the term "mole" and its variations may be applied to elemental, ionic, and any other chemical species defined by number and type of atoms present, as well as to compounds with well defined molecules.

SUMMARY OF THE INVENTION

It has been found that aqueous liquid compositions intended to provide a protective coating on metal surfaces are often capable of staining or otherwise corroding metal surfaces during the time of treatment. In some case, relatively minor corrosion, often referred to as "etching", is desirable because it promotes good adhesion of a protective coating to the surface treated. However, gross corrosion of the metal surface during treatment is almost always undesirable, and in many cases, any change in color or texture of the metal surface that is readily detectable visually is undesirable, particularly when the protective coating applied is totally or substantially transparent and/or is applied only for temporary protection and removed before ultimate consumer use of the metal article treated (as would normally be true, for example, of a drawing lubricant), and the aesthetic qualities of the treated metal surface are a substantial desideratum of the final use of the metal supplied with a protective coating according to this invention. Therefore, one object of this invention is to provide aqueous liquid metal coating compositions that have a reduced tendency toward corroding, staining, and/or altering the color or texture of metal surfaces treated with the aqueous liquid metal coating compositions.

Accordingly, one embodiment of the invention is an aqueous liquid composition comprising, preferably consisting essentially of, or more preferably consisting of, water and:

(A) dissolved or dispersed constituents, exclusive of organic azoles but including at least some organic constituents, that are capable of reacting with one another, with a metal surface being treated, or both, or of spontaneously coalescing, or of both reacting and spontaneously coalescing, during or after at least one of (i) contact of the aqueous liquid composition with a metal surface, (ii) separation of a metal surface from such contact, and (iii) removal of water from any liquid film remaining on a metal surface after such contact and subsequent removal from contact of the metal with the aqueous liquid composition, so as to form on the surface of the metal being treated an adherent protective film; said contact of the aqueous liquid composition with the metal surface and said removal of water from any liquid film remaining on the metal after such contact and subsequent removal from contact of the metal with the aqueous liquid composition both occurring at a temperature not less than 20° C.;

(B) a primary inhibitor component selected from the group consisting of non-sulfur-containing organic azole compounds, preferably organic triazoles, more preferably benzotriazole or tolyltriazole; and (C) a secondary inhibitor component selected from the group consisting of organic azoles that also contain mercapto moieties, preferably mercaptobenzothiazole or mercaptobenzimidazole.

Embodiments of the invention include working aqueous liquid compositions suitable for contacting directly with hetal surfaces to provide protective coatings thereon as described above; liquid or solid concentrates that will form such working aqueous liquid compositions upon dilution with water only; processes of using working aqueous liquid compositions according to the invention as defined above to form protective coatings on metal surfaces; protective solid coatings on metal surfaces formed in such a process, and metal articles bearing such a protective coating; and concentrates comprising, preferably consisting essentially of, or more preferably consisting of components (B) and (C) as described above, and, optionally, also water.

DESCRIPTION OF PREFERRED EMBODIMENTS

The chemical nature and amount of component (A) in a working aqueous liquid composition according to the invention depend on the purpose of the treatment and in general preferably are the same as or similar to the chemical nature and amount of materials used for similar protective purposes in the prior art. Some specific examples particularly suited to the present invention are given below, and any explicit specification herein is to be understood as superseding any contrary teachings from the prior art.

The concentration of component (B) in a working aqueous liquid composition according to this invention preferably is, with increasing preference in the order given, not less than 10, 40, 100, 200, 400, 800, 1200, 1400, 1500, 1600, 1700, 1750, 1800, 1850, 1900, 1925, 1950, or 1975 parts per million (hereinafter often abbreviated "ppm") of the total composition and independently preferably is, with increasing preference in the order given, not more than 20,000, 10,000, 5000, 3500, 3300, 3100. 2800, 2500, 2400, 2300, 2250, 2200, 2175, 2150, 2125, 2100, 2075, 2050, or 2025 ppm. Chemically, as already noted above, it is preferred for component (B) to be selected from benzotriazole and tolyltriazole, and in fact a mixture of these two is more preferred than either of them alone. The amount of each of benzotriazole and tolyltriazole, expressed as a percentage of the total of component (B) preferably is, with increasing preference in the order given, independently for each of these two triazoles, not less than 5, 10, 15, 20, 25, 30, 35, 38, 41, 43, 45, 47, 48, or 49% and independently preferably is, with increasing preference in the order given, not more than 95, 90, 85, 80, 75, 70, 65, 62, 59, 57, 55, 53, 52, or 51

The concentration of component (C) in a working aqueous liquid composition according to this invention preferably is, with increasing preference in the order given, not less than 1, 4, 10, 15, 20, 25, 30, 35, 38, 41, 43, 45, 47, or 49 ppm of the total composition and independently preferably is, with increasing preference in the order given, not more than 2000, 1000, 500, 350, 300, 250, 200, 175, 165, 155, 145, 135, 125, 120, 115, 110, 107, 110, 108, 106, 105, 104, 103, 102, or 101 ppm. The ratio of the concentration of component (C) to the concentration of component (B) preferably is, with increasing preference in the order given, not less than 0.001:1, 0.002:1, 0.004:1, 0.007:1, 0.011:1.0, 0.015:1.0, 0.019:1.0, 0.020:1.0, 0.021:1.0, 0.022:1.0, 0.023:1.0, or 0.024:1.0 and independently preferably is, with increasing preference in the order given, not more than 2:1, 1:1, 0.5:1, 0.3:1, 0.2:1, 0.1:1, 0.09:1.0, 0.08:1.0, 0.07:1.0, 0.06:1.0, 0.05:1.0, 0.04:1.0, 0.035:1.00, 0.033:1.00, 0.031:1.00, 0.029:1.00, 0.028:1.00, 0.027:1.00, or 0.026:1.00. These ratios, unlike the concentration preferences stated above, apply to concentrates as well as to working compositions.

For various reasons it is often preferred that the compositions according to the invention be free from various materials often used in prior art coating compositions. In particular, compositions according to this invention in most instances preferably contain, with increasing preference in the order given, and with independent preference for each component named, not more than 5, 2, 1, 0.5, 0.25, 0.12, 0.06, 0.03, 0.015, 0.007, 0.003, 0.001, 0.0005, 0.0002, or 0.0001% of any of (i) hydrocarbons, (ii) fatty oils of natural origin, (iii) other ester oils and greases that are liquid at 25° C., (iv) metal salts of fatty acids, (v) hexavalent chromium, (vi) nickel cations, (vii) cobalt cations, (viii) copper cations, (ix) manganese in any ionic form, (x) graphite, and (xi) molybdenum sulfide.

One class of component (A) to which this invention is especially well adapted is materials that will form on treated metal a coating that is protective for cold working. More particularly, a preferred component (A) according to a first preferred specific embodiment of this invention comprises, more preferably consists essentially of, or still more preferably consists of, the following subcomponents:

(A.1.A) copolymers of styrene with (i) maleic anhydride, (ii) maleic acid, (iii) salts of maleic acid with ammonia, alkali metal hydroxides, and amines, or (iv) mixtures of any two or more of these, said copolymers containing a sufficient number of salt groups to be soluble and/or dispersible in water; and (A.1.B) a component consisting of ethoxylated alcohol molecules; and, optionally, one or more of:

(A.1.C) an inorganic boron containing component;

(A.1.D) an extreme pressure and corrosion resistant additive component as known per se in the art;

(A.1.E) a component of dispersed and/or dissolved solid lubricant, exclusive of inorganic boron containing materials, as known per se in the art; and (A.1.F) a component selected from solid and liquid hydrocarbons.

At least part of each of components (A.1.A) and (A.1B) must be present in a chemical form other than esters formed by reaction with each other.

For purposes of this description, the term "maleic moiety" is defined as a portion of a polymer chain that conforms to one of the following general chemical formulas:

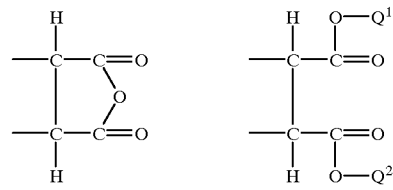

wherein each of $Q^1$ and $Q^2$, which may be the same or different, is selected from the group consisting of hydrogen, alkali metal, ammonium, and substituted ammonium cations. The copolymers of styrene and maleic moieties to be used in the first preferred specific embodiment of the invention preferably have a molar ratio of styrene to the maleic moieties in the range from 1:1 to 3:1, more preferably in the range from 1.5:1 to 2.6:1, still more preferably in the range from 1.8:1 to 2.3:1. Independently, the copolymers of styrene and maleic moieties to be used in the first preferred specific embodiment of the invention preferably are selected from polymers that have an average molecular weight in the range from 1100 to 2700, more preferably in the range from 1600 to 1950, still more preferably in the range from 1650 to 1750. Preferably these copolymers of styrene and maleic moieties to be used in this first preferred specific embodiment of the invention contain no more than 25, or with increasing preference no more than 12, 5, 3, or 0.5% of units derived from other monomers.

The compositions according to this first preferred specific embodiment of this invention provide a very pliable and ductile lubricating film, thereby leading to superior cold forming processes.

Inorganic boron containing materials, optional component (A.1.C), and extreme pressure additives, optional component (A.1.D) above, are generally preferred components in compositions according to this first preferred specific embodiment of the invention, while other solid lubricants and hydrocarbons, optional items (A.1.E) and (A.1.F) above, generally are preferably omitted, although they may be useful in some applications.

Concentrates according to the first preferred specific embodiment of the invention preferably contain from 10–40%, or more preferably from 20–40%, of dispersed or dissolved solids. Lubricant compositions according to this first preferred specific embodiment of the invention, suitable for direct application to metal surfaces to be lubricated, preferably contain from 3–20, more preferably from 6–17, still more preferably from 10–14, % of total dissolved solids.

The working compositions according to this first preferred specific embodiment of the invention are often used at fairly high temperatures such as 70° C. or more. At such temperatures, if the compositions contain unsubstituted ammonium cations, or other ammonium cations derived from high volatility amines, there is a substantial concentration of ammonia or free amine in the vapor space over the liquid working composition at equilibrium. Such concentrations can be objectionable to workers using the process.

In an industrial application, ammonia and/or amine concentrations are conventionally measured by a Drager test apparatus, which gives readings in $NH_3$ equivalents, with amines as well as with ammonia itself. It is preferred that the cations other than hydrogen used in a composition according to this first preferred specific embodiment of the invention be chosen from ammonium ions of amines having sufficiently low volatility that the equilibrium overpressure of $NH_3$ equivalents as measured by a Drager test apparatus in the atmosphere over compositions according to this first preferred specific embodiment of the invention at a temperature of 70° C. is, with increasing preference in the order given, not more than 50, 35, 25, 14, 9, 6, or 4 parts per million (hereinafter "ppm") of ammonia equivalent.

Independently, it is preferred, with increasing preference in the order given, that at least 50, 78, or 91 mole percent of the cations other than hydrogen present in component (A.1.A) as described above be selected from the group consisting of substituted ammonium cations derived by adding a proton to amines that will dissolve to form at least 0.01 M solutions, with a pH value of at least 10, in water. More preferably, the amines contain at least one hydroxyl group per molecule. Still more preferably, the substituted ammonium cations are selected from the cations formed by adding a proton to diethylethanol amine, dimethylethanol amine, diethanol amine, monoethanol amine, or isopropanol amine.

It is also preferred that the pH of the liquid compositions for direct application to metal surfaces (also denoted as "working compositions" herein) fall within the range from 6 to 11, more preferably in the range from 7.5 to 9.0, or still more preferably from 8.2 to 8.8. If needed, alkaline materials, preferably ammonium, sodium, potassium, or lithium hydroxide, in addition to the amines noted above, may be added to the compositions in order to achieve a pH within these ranges.

Component (A.1.B) of the compositions according to this first preferred specific embodiment of the invention is preferably selected from alcohols having a chemical structure that can be produced by condensing ethylene oxide with primary, preferably straight chain, aliphatic alcohols having only one hydroxyl group and from 28 to 65, more preferably from 40 to 60, still more preferably from 48 to 52 carbon atoms per molecule. Independently, it is preferred that the molecules of component (A.1.B) contain from 20 to 80, more preferably from 40 to 62, still more preferably from 48–51 percent of their total weight in the portion of each molecule having the chemical structure $(CH_2-CH_2-O)_n$, where n is a positive integer.

The ratio by weight of component (A.1A) to component (A.1.B) in compositions according to this first preferred specific embodiment of the invention is preferably between 6:1 and 1:6, or, in order of increasing preference, between 4:1 to 1:4, 2.5:1 to 1:2.5, 1:1.6 to 1:2.5, or 1:1.9 to 1:2.1.

Component (A.1.C) of compositions according to this first preferred specific embodiment of the invention is preferably selected from the group consisting of boric acid and condensed boric acids, alkali metal and ammonium salts of boric acid and condensed boric acids; more preferably, component (A.1.C) is selected from boric acid, borax, and mixtures thereof; most preferably a mixture of boric acid and borax in a ratio of 2.0:1.0 is used. When component (A.1.C) is used, the ratio of the total of the stoichiometric equivalent as $H_3BO_3$ of the boron in component (A.1.C) to the total of the solids content in components (A.1.A) and (A.1B) preferably is, with increasing preference in the order given, not less than 0.02:1.0, 0.04:1.0, 0.06:1.0, 0.08:1.0, 0.10:1.0, 0.12:1.0, 0.14:1.0, 0.16:1.0, 0.18:1.0, 0.19:1.0, 0.20:1.0, 0.21:1.0, 0.22:1.0, or 0.23:1.0 and independently preferably is, with increasing preference in the order given, not more than 2.5:1.0, 1.2:1.0, 0.8:1.0, 0.6:1.0, 0.40:1.0, 0.37:1.0, 0.34:1.0, 0.31:1.0, 0.29:1.0, 0.28:1.0, 0.27:1.0, 0.26:1.0, or 0.25:1.0.

Component (A.1.D) of the compositions according to this first preferred specific embodiment of the invention is preferably selected from partial esters, or salts of partial esters, of phosphoric acid with alcohols having a molecular structure that contains both (i) a part having the structure $-(CH_2)_m-$, where m is an integer between 12 and 22 inclusive, more preferably between 16 and 22 inclusive, and (ii) a part having the structure $(CH_2-CH_2-O)_p$, where p is an integer having a sufficiently large value that the total alcohol is soluble in water to the extent of, with increasing preference in the order given, at least 0.1, 0.4, 0.9, 1.3, 1.8, and 3%. When component (A.1.D) is used, it is preferably present in a ratio by weight to the total of components (A.1.A) and (A.1.B) within the range from 1:10 to 1:200, or more preferably from 1:25 to 1:70, still more preferably from 1:40 to 1:55.

If component (A.1.E) is used, it preferably is selected from the group consisting of graphite, molybdenum disulfide, mica, talc, and zinc oxide.

If component (A.1.F) is used, it preferably is selected from substantially unsaturated aliphatic hydrocarbon compounds, including oligomers of ethylene, propylene, or mixtures of ethylene and propylene, with a molecular weight in the range from 750–3000, more preferably in the range from 1000–2000.

The specific areal density (also often called "add-on weight [or mass]") of a composition according to this first preferred specific embodiment of this invention present in place on metal to be cold worked, after application from a liquid composition to the metal surface and air drying of liquid thus applied, is, in order of increasing preference, from 0.1 to 15, 1 to 10, or 2 to 6 grams per square meter of surface ("$g/m^2$").

For cold drawing of steel, a lubricant composition according to this first preferred specific embodiment of this invention preferably is used on clean bare steel without any intermediate coating. However, a lubricant composition according to this first preferred specific embodiment of this invention can also be used over an underlying zinc phosphate conversion coating layer formed on the steel. The zinc phosphate conversion coating may be formed by methods known per se in the art. Any phosphate conversion coating used before application of a lubricant composition according to this first preferred specific embodiment of this invention preferably has an areal density (also often denoted as "add-on weight [or mass]") of from 1 to 50, or with increasing preference, from 1 to 30, 1 to 20, or 2 to 15, g/m².

In a second preferred specific embodiment of this invention, component (A) as described above comprises, more preferably consists essentially of, or still more preferably consists of, the following subcomponents:

(A.2.A) an at least partially neutralized film forming copolymer of an alkylene and an acrylic acid, such at least partially neutralized polymers of organic acids often being denoted in the art generally and hereinbelow as "ionomers";

(A.2.B) an alkoxylated alcohol film forming component; and, optionally, (A.2.C) a boron containing inorganic acid or salt.

A polymer is defined as "film forming" for the purposes of this description if, when a solution or suspension of the polymer in water is dried at a temperature of at least 25° C. from a liquid film thickness not greater than 1 millimeter, a continuous and coherent film that is solid at 25° C. is produced.

Compositions according to this second preferred embodiment of the invention also provide a very pliable and ductile lubricating film, as does the first specific embodiment described above.

The pH value of working compositions according to this second preferred embodiment of the invention preferably is, with increasing preference in the order given, not less than 3, 4, 5, 6, 7, 7.3, 7.5, 7.7, 7.8, 7.9, or 8.0 and independently preferably is, with increasing preference in the order given, not more than 11, 10, 9.7, 9.4, 9.1, 9.0, 8.9, 8.8, 8.7, 8.6, or 8.5.

The alkylene polymerized to make component (A.2.A) preferably is selected from the group consisting of ethene, propene, 2-methyl propene, and 1- and 2-butenes; most preferably it is ethene (more commonly called "ethylene"). For the other required monomer to make component (A.2.A), acrylic acid is most preferred, but methacrylic acid and other substituted acrylic acids with not more than six, preferably not more than four, carbon atoms may also be used. The fraction of the mass of the polymer made up of alkylene residues preferably is, with increasing preference in the order given, not less than 1, 2, 4, 8, 16, 32, 50, 60, 65, 70, 73, 76, 79, 81, 82, 83, or 84%; independently, the fraction of the mass of the polymer made up of alkylene residues preferably is, with increasing preference in the order given, not more than 99, 96, 94, 92, 91, 90, 89, 88, 87, or 86%. Independently, the fraction of the mass of the polymer made up of (optionally substituted) acrylic acid and acrylate residues preferably is, with increasing preference in the order given, not less than 1, 2, 4, 6, 8, 9, 10, 11, 12, 13 or 14%; independently, the fraction of the mass of the polymer made up of these acrylic acid and acrylate residues preferably is, with increasing preference in the order given, not more than 99, 75, 50, 40, 30, 25, 21, 18, 17, or 16%. The fraction of the total of the (optionally substituted) acrylic acid and acrylate residues that are (optionally substituted) acrylate residues, in other words, the fraction of the total (optionally substituted) acrylic moieties in the polymer that are neutralized rather than acidic, preferably is, with increasing preference in the order given, not less than 10, 20, 40, 50, 60, 70, 75, 80, 85, 90, 92, 94, 96, or 98%.

Normally, commercially available polymers in latex form are preferred for component (A.2.A); a variety of such commercial products are available. Such products normally contain small amounts of surfactants for stabilizing the polymers in suspension; these surfactants normally have no adverse effect on compositions according to this invention.

The counterions for the neutralized acrylic acid units in the polymers are preferably selected from the group consisting of magnesium, calcium, zinc, and alkali metal ions. If alkali metal ions are used, the compositions preferably contain optional component (A.2.C) as described above. Even if other counterions are used, the compositions may contain component (A.2.C), but the favorable effect of this component is normally less than when the counterions are alkali metal ions.

The oxyalkylene units in component (A.2.B) of a composition according to this second preferred embodiment of this invention preferably have not more than 4, more preferably not more than 3, most preferably 2, carbon atoms per unit. Component (A.2.B) of the compositions according to the invention is preferably selected from molecules having a chemical structure that can be produced by condensing an alkylene oxide with primary, preferably straight chain, aliphatic alcohols having only one hydroxyl group and from 30 to 65, more preferably from 40 to 60, still more preferably from 48 to 52 carbon atoms per molecule. Independently, it is preferred that the molecules of component (A.2.B) contain, with increasing preference in the order given, at least 20, 30, 35, 40, 43, 47, or 49%, and independently preferably contain, with increasing preference in the order given, not more than 80, 70, 62, 57, 54, or 51% of their total mass in the oxyalkylene units.

The ratio by weight of component (A.2.A) to component (A.2.B) in compositions according to this second preferred embodiment of the invention preferably is, with increasing preference in the order given, at least 1:10, 1:8, 1.0:6.5, 1.0:5.0, 1.0:3.5, 1.0:2.5, 1.0:2.0, 1.0:1.7, 1.0:1.5, 1.0:1.3, 1.0:1.20, 1.0:1.17, 1.0:1.12, 1.0:1.10, 1.0:1.07, 1.0:1.04, 1.0:1.03, 1.0:1.02, or 1.0:1.01, and independently preferably is, with increasing preference in the order given, not more than 10:1, 5:1.0, 3:1.0, 2.5:1.0, 2.0:1.0, 1.8:1.0, 1.6:1.0, 1.50:1.0, 1.40:1.0, 1.35:1.0, 1.30:1.0, 1.25:1.0, 1.20:1.0, 1.15:1.0, 1.12:1.0, 1.09:1.0, 1.07:1.0, 1.05:1.0, 1.03:1.0, or 1.01:1.0.

Component (A.2.C) of compositions according to this second preferred specific embodiment of the invention is preferably selected from the group consisting of boric acid and condensed boric acids, alkali metal and ammonium salts of boric acid and condensed boric acids; more preferably, component (A.1.C) is selected from boric acid, borax, and mixtures thereof; most preferably a mixture of boric acid and borax in a ratio of 2.0:1.0 is used. When component (A.2.C) is used, the ratio of the total of the stoichiometric equivalent as $H_3BO_3$ of the boron in component (A.2.C) to the total of the solids content in components (A.2.A) and (A.2.B) preferably is, with increasing preference in the order given, not less than 0.01:1.0, 0.02:1.0, 0.04:1.0, 0.06:1.0, 0.08:1.0, 0.10:1.0, 0.11:1.0, 0.12:1.0, 0.13:1.0, 0.14:1.0, 0.15:1.0, 0.16:1.0, or 0.17:1.0 and independently preferably is, with increasing preference in the order given, not more than 2.0:1.0, 1.2:1.0, 0.8:1.0, 0.6:1.0, 0.4:1.0, 0.28:1.0, 0.25:1.0, 0.22:1.0, 0.21:1.0, 0.22:1.0, 0.21:1.0, 0.20:1.0, 0.19:1.0, or 0.18:1.0.

The total solids content of a working composition according to this second preferred specific embodiment of the invention preferably is, with increasing preference in the order given, not less than 1, 2, 3, 4, 5, 5.5, 6.0, 6.5, 7.0, 7.4, 7.7, 8.0, 8.3, 8.5, 8.7, 8.8, or 8.9% and independently preferably is, with increasing preference in the order given, not more than 50, 35, 25, 20, 18, 17, 16, 15.5, or 15.1%.

The areal density (also often called "add-on weight [or mass]") of a composition according to this second preferred specific embodiment of this invention present in place on the surface of metal to be cold worked preferably is, with increasing preference in the order given, not less than 0.1, 0.2, 0.4, 0.7, 1.0, 2.0, 2.5, 2.9, 3.2, 3.5, 3.7, 3.8, 3.9, 4.0, 4.1, or 4.2 grams of solids per square meter of surface (hereinafter often abbreviated "g/m$^2$") and independently preferably is, with increasing preference in the order given, not more than 60, 40, 30, 20, 17, 15, 13, 12, 11, 10, 9.0, 8.5, 8.0, 7.7, 7.4, 7.1, 6.9, 6.7, or 6.6 g/m$^2$.

The practice of this invention may be further appreciated by consideration of the following, non-limiting, working examples, and the benefits of the invention may be further appreciated by reference to the comparison examples.

EXAMPLE AND COMPARISON EXAMPLE GROUP 1

In this group the substrates were cylindrical steel tubes about 2.5 centimeters (hereinafter often abbreviated "cm") in diameter and 12.7 cm long. Three such tubes were oriented with their cylindrical axes mutually parallel and the cylindrical surface of each of the three tubes tangent to the cylindrical surfaces of the other two tubes, then tied together while maintaining this orientation, in order to form a bundle that deliberately created contact lines and narrow inter-contact spaces with relatively poor liquid circulation, as such areas are known to be more prone to staining, discoloration, and/or corrosion during treatment than surfaces with facile liquid access during the treatment process. The tube bundles were then subjected to the process sequence shown in Table I below.

TABLE I

PROCESS SEQUENCE

| Step No. | Step Name | Treatment Composition | Contact Conditions ° C. | Min |
|---|---|---|---|---|
| 1 | Cleaning | PARCO ™ Cleaner 2077X | 88 ± 2 | 15 |
| 2 | Rinsing | Tap Water | 54 ± 2 | 1 |
| 3 | Pickling | 10 % H$_2$SO$_4$ in water | 71 ± 2 | 5 |
| 4 | Rising | Tap water | 20 ± 5 | 1 |
| 5 | Coating | As described elsewhere herein | 71 ± 2 | 2 |
| 6 | Baking | Air | 77 ± 5 | 30 |

Notes for Table I
"° C." indicates the temperature in Centigrade degrees of the fluid during contact with the substrate being treated. "Min" indicates the time of contact in minutes. PARCO ™ Cleaner 2077X is a conventional strong alkaline cleaner, commercially available from the Parker Amchem Division of Henkel Corporation, Madison Heights, Michigan, USA; the solution used for cleaning in Step 1 above contained 30 grams of the commercially supplied powder per liter of solution. Contact was by immersion in the fluid in all steps listed.

After completing the process shown in Table I, the bundles were separated and the contact lines and area between the contact lines was examined for any evidence of discoloration, staining, or corrosion that could be detected with unaided normal human vision. The percentage of the total area that exhibited any evidence of such blemishing was reported using the following rating scale:

0: No detectable blemishing

1: Blemishing, but on no more than 10% of the area examined

2: Blemishing on from >10% to 20% of the area examined

3: Blemishing on from >20% to 30% of the area examined

4: Blemishing on from >30% to 40% of the area examined

5: Blemishing on >40% of the area examined.

The coating composition used had a pH value of about 8.5 and contained the following amounts and types of ingredients (the amounts are specified as solids for ingredients identified by trademarked names or identified as polymers and are specified as amounts of the chemical formula shown for ingredients identified by chemical formula; the balance of the composition not specified below was water):

7.0% of UNITHOX™ 750, ethoxylated alcohol, commercially supplied by Petrolite Corp., Tulsa, Okla., USA;

3.7% of "SMA 2000" styrene-maleic anhydride copolymer, neutralized with diethylethanolamine; commercially available from ATOCHEM, INC., Malvern, Pa.

2.0% of H$_3$BO$_3$;

1.0% of Na$_2$B$_4$O$_7$.10 H$_2$O;

0.2% of ANTARA™ LB-400 phosphate ester, commercially available from GAF, New York, N.Y. (an extreme pressure lubricant); and, where specified in Table 1, also contained the types and amounts of inhibitor components shown in that Table. UNITHOX™ 750 is described by its supplier as a product made by ethoxylating primary straight chain alcohols with an average carbon number of about 50 to produce a surfactant with an average of 16 ethylene oxide residues per molecule.

EXAMPLE AND COMPARISON EXAMPLE GROUP 2

In this group, the tubes used as substrates had the same diameter as those used for Group 1, but they were 3.66 meters long and were processed individually rather than in bundles of three. Various types of steel were used, as shown in Table 2. One of the coating solutions used in this group had the same composition as is given above for Group 1; this was briefly denoted "SMA". In this group, another base coating solution briefly denoted as "AI" was also used. This "AI" coating solution contained the following amounts and types of ingredients (the amounts are specified as solids for ingredients identified by trademarked names or identified as polymers and are specified as amounts of the chemical formula shown for ingredients identified by chemical formula; the balance of the composition not specified below was water):

3.75% of UNITHOX™ 750, ethoxylated alcohol, commercially supplied by Petrolite Corp., Tulsa, Okla., USA;

TABLE 1

| Concentration in ppm in the Coating Composition of: | | | | Blemishing |
|---|---|---|---|---|
| Benzotriazole | Tolyltriazole | MBTA | MBIA | Rating |
| 0 | 0 | 0 | 0 | 5 |
| 2000 | 0 | 0 | 0 | 3 |
| 0 | 2000 | 0 | 0 | 4 |
| 0 | 0 | 50 | 0 | 4 |
| 0 | 0 | 0 | 100 | 4 |
| 1000 | 1000 | 0 | 0 | 3 |
| 1000 | 1000 | 50 | 0 | 2 |
| 1000 | 1000 | 0 | 100 | 2 |
| 2000 | 0 | 0 | 100 | 3 |
| 0 | 2000 | 0 | 100 | 5 |
| 2000 | 0 | 50 | 0 | 4 |
| 0 | 2000 | 50 | 0 | 2 |
| 1000 | 1000 | 0 | 50 | 3 |

Notes for Table 1
"MBTA" = mercaptobenzothiazole; "MBIA" = mercaptobenzimidazole 3.75% of ACQUA™ 250 aqueous dispersion of ethylene-acrylic acid copolymer, neutralized with calcium hydroxide, commercially available from Allied Signal Corp., A–C™ Performance Additives Group;

1.0% of H₃BO₃;

0.5% of Na₂B₄O₇.10 H₂O;

where specified in Table 2, also contained the types and amounts of inhibitor components shown in that Table, where they are indicated as follows: "Thiazole" means the only inhibitor component was 50 ppm of 2-mercaptobenzothiazole; "triazoles" means that the only inhibitor components were a mixture of 1000 ppm of each of tolyltriazole and benzotriazole; "combination" means that all three of these materials in the same concentrations as noted above were included in the coating composition.

After processing in the process sequence shown in Table I, the tubes were cross-sectioned so that the interior of the tubes could be examined for evidence of corrosion, staining, and/or discoloration. Ratings from this examination, as shown in Table 2, were reported on the following scale:

0: No visible discoloration or corrosion

1: Light yellow to light brown discoloration

2: Dark brown discoloration

3: Very dark discoloration and corrosion.

TABLE 2

| Tube Steel Type | Base Coating | Inhibitor(s) | Rating |
|---|---|---|---|
| SAE 1018 | AI | Thiazole | 1 |
| SAE 1018 | AI | Combination | 0 |
| SAE 4130 | AI | Thiazole | 1–2 |
| SAE 4130 | AI | Combination | 0 |
| SAE 1026 | AI | Thiazole | 1–2 |
| SAE 1026 | AI | Combination | 0 |
| SAE 1018 | SMA | Triazoles | 1 |
| SAE 1018 | SMA | Combination | 0 |
| SAE 1010 | SMA | Combination | 0 |
| SAE 1010 | AI | Combination | 0 |

The invention claimed is:

1. An aqueous liquid composition suitable for applying over a surface of a metal substrate to form a liquid coating from which a solid protective coating film can be formed on said surface, said aqueous liquid composition consisting essentially of water and:

(A) a film-forming component of dissolved or dispersed polymeric constituents, exclusive of organic azoles but including at least some organic constituents that are capable of reacting with one another, with a metal surface being treated; or both or spontaneously coalescing; or both reacting and spontaneously coalescing; during or after at least one of (i) contact of the aqueous liquid composition with a metal surface, (ii) removal of water from said liquid coating remaining on the metal after such contact; said contact of the aqueous liquid composition with said metal surface and said removal of water from any liquid coating remaining on the metal after such contact occurring at a temperature not less than 20° C., so as to form on the surface of the metal being treated an adherent protective solid film; said film-forming component is selected from the group consisting of:

(A.1) (A.1.A) copolymers of styrene with (i) maleic anhydride, (ii) maleic acid, (iii) salts of maleic acid with ammonia, alkali metal hydroxides, and amines, or (iv) mixtures of any two or more of said copolymers; and (A.1.B) ethoxylated alcohol, and optionally one or more, (A.1.C) an inorganic boron containing component, (A.1.D) an extreme pressure or corrosion resistant additive, (A.1.E) a dispersed and/or dissolved solid lubricant exclusive of (A.1.C), (A.1.F) a component selected from solid and liquid hydrocarbons; and (A.2) (A.2.A) partially neutralized copolymers of an alkylene having not more than 4 carbon atoms with (i) acrylic acid or (ii) alkyl substituted acrylic acids having not more than 6 carbon atoms, (A.2.B) an alkoxylated alcohol film forming component, and, optionally (A.2.C) a boron containing inorganic salt or acid;

(B) a primary inhibitor component selected from the group consisting of non-sulfur-containing organic azole compounds; and (C) a secondary inhibitor component selected from the group consisting of organic azoles that also contain mercapto moieties, wherein the concentration of component (B) is from about 100 ppm to about 10,000 ppm, the concentration of component (C) is from about 10 ppm to about 500 ppm, and the ratio of the concentration in ppm of component (C) to the concentration in ppm of component (B) is from about 0.0002:1.0 to about 0.2:1.0.

2. An aqueous liquid composition according to claim 1, wherein the concentration of component (B) is from about 400 ppm to about 5000 ppm, the concentration of component (C) is from about 30 ppm to about 300 ppm, component (C) is selected from the group consisting of mercaptobenzothiazole and mercaptobenzimidazole, and the ratio of the concentration of component (C) to the concentration of component (B) is from about 0.007:1.0 to about 0.1:1.0.

3. An aqueous liquid composition according to claim 1, wherein the concentration of component (B) is from about 800 ppm to about 2500 ppm, the concentration of component (C) is from about 35 ppm to about 155 ppm, and the ratio of the concentration of component (C) to the concentration of component (B) is from about 0.019:1.0 to about 0.035:1.0.

4. An aqueous liquid composition according to claim 3, wherein the concentration of component (B) is from about 1200 ppm to about 2250 ppm, the concentration of component (C) is from about 41 ppm to about 115 ppm, and the ratio of the concentration of component (C) to the concentration of component (B) is from about 0.021:1.0 to about 0.031:1.0.

5. An aqueous liquid composition according to claim 4, wherein the total solids concentration is from about 6 to about 17%, the pH value is from about 7.5 to about 9.0, and component (A) consists essentially of:

(A.1.A) copolymers of styrene with (i) maleic anhydride, (ii) maleic acid, (iii) salts of maleic acid with ammonia, alkali metal hydroxides, and amines, or (iv) mixtures of any two or more of these, said copolymers having a molar ratio of styrene to maleic moieties in the range from 1.5:1 to 2.6:1, an average molecular weight from about 1600 to about 1950, a sufficient number of salt groups to be soluble or dispersible in water, no more than about 5% of units derived from any monomers other than styrene and maleic moieties, and at least 78 mole % of the cations other than hydrogen in the maleic moieties being substituted ammonium cations derived by adding a proton to amines that will dissolve in water to form at least 0.01 M solutions having a pH value of at least about 10; and (A.1.B) a component consisting of ethoxylated alcohol molecules that can be produced by condensing ethylene oxide with primary straight chain alcohols having from about 40 to about 60 carbon atoms per molecule and from about 40 to about 62% of their total weight in the portion of each molecule that has the chemical structure ($CH_2$—$CH_2$—O)$_n$, where n is a positive integer, the ratio of the amount of component (A.1A) to the amount of component (A.1.B) being from about 1.0:1.6 to about 1.0:2.5; and (A.1.C) an inorganic boron containing component selected from the group consisting of boric acid and condensed boric acids and their alkali metal and ammonium salts, in an amount such that the ratio of the total stoichiometric equivalent as $H_3BO_3$ of the boron in this component to the total of the solids content in components (A.1.A) and (A.1.B) is from about 0.14:1.0 to about 0.34:1.0; and, optionally, one or more of:

(A.1.D) an extreme pressure and corrosion resistant additive component selected from the group consisting of partial esters and salts of partial esters of phosphoric acid with alcohols having a molecular structure that contains both (i) a part having the structure —($CH_2$)$_m$—, where m is an integer between 12 and 22 inclusive, and (ii) a part having the structure ($CH_2$—$CH_2$—O)$_p$, where p is an integer having a sufficiently large value that the total alcohol is soluble in water to the extent of at least 1.3%;

(A.1.E) a component of dispersed and/or dissolved solid lubricant selected from the group consisting of graphite, molybdenum disulfide, mica, talc, and zinc oxide; and (A.1.F) a component selected from oligomers of ethylene, propylene, or mixtures of ethylene and propylene having an average molecular weight in the range from about 750 to about 3000, wherein at least part of each of components (A.1.A) and (A.1.B) is present in a chemical form other than esters formed by reaction with each other.

6. An aqueous liquid composition according to claim 5, wherein the total solids concentration is from about 10 to about 14%, the pH value is from about 8.2 to about 8.8, and component (A) consists essentially of:

(A.1.A) copolymers of styrene with (i) maleic anhydride, (ii) maleic acid, (iii) salts of maleic acid with ammonia, alkali metal hydroxides, and amines, or (iv) mixtures of any two or more of these, said copolymers having a molar ratio of styrene to maleic moieties in the range from 1.8:1 to 2.3:1, an average molecular weight from about 1650 to about 1750, a sufficient number of salt groups to be soluble or dispersible in water, no more than about 3% of units derived from any monomers other than styrene and maleic moieties, and at least 91 mole % of the cations other than hydrogen in the maleic moieties being substituted ammonium cations derived by adding a proton to amines selected from the group consisting of diethylethanol amine, dimethylethanol amine, diethanol amine, monoethanol amine, or isopropanol amine;

(A.1.B) a component consisting of ethoxylated alcohol molecules that can be produced by condensing ethylene oxide with primary straight chain alcohols having from about 48 to about 52 carbon atoms per molecule and from about 48 to about 51% of their total weight in the portion of each molecule that has the chemical structure ($CH_2$—$CH_2$—O)$_n$, where n is a positive integer, the ratio of the amount of component (A.1.A) to the amount of component (A.1.B) being from about 1.0:1.9 to about 1.0:2.1; and (A.1.C) boric acid and borax in a ratio of about 2.0:1.0 in an amount such that the ratio of the total stoichiometric equivalent as $H_3BO_3$ of the boron in this component to the total of the solids content in components (A.1.A) and (A.1.B) is from about 0.19:1.0 to about 0.27:1.0; and (A.1.D) an extreme pressure and corrosion resistant additive component selected from the group consisting of partial esters and salts of partial esters of phosphoric acid with alcohols having a molecular structure that contains both (i) a part having the structure —($CH_2$)$_m$—, where m is an integer between 16 and 22 inclusive, (ii) a part having the structure ($CH_2$—$CH_2$—O)$_p$, where p is an integer having a sufficiently large value that the total alcohol is soluble in water to the extent of at least 1.8%, the ratio of the amount of component (A.1.D) to the total solids content of components (A.1.A) and (A.1.B) being from about 1:25 to about 1:70; and, optionally, one or more of:

(A.1.E) a component of dispersed and/or dissolved solid lubricant selected from the group consisting of graphite, molybdenum disulfide, mica, talc, and zinc oxide; and (A.1.F) a component selected from oligomers of ethylene, propylene, or mixtures of ethylene and propylene having an average molecular weight in the range from about 750 to about 3000.

7. An aqueous liquid composition according to claim 3, wherein the total solids concentration is from about 6 to about 17%, the pH value is from about 7.5 to about 9.0, and component (A) consists essentially of:

(A.1.A) copolymers of styrene with (i) maleic anhydride, (ii) maleic acid, (iii) salts of maleic acid with ammonia, alkali metal hydroxides, and amines, or (iv) mixtures of any two or more of these, said copolymers having a molar ratio of styrene to maleic moieties in the range from 1.5:1 to 2.6:1, an average molecular weight from about 1600 to about 1950, a sufficient number of salt groups to be soluble or dispersible in water, no more than about 5% of units derived from any monomers other than styrene and maleic moieties, and at least 78 mole % of the cations other than hydrogen in the maleic moieties being substituted ammonium cations derived by adding a proton to amines that will dissolve in water to form at least 0.01 M solutions having a pH value of at least about 10; and (A.1.B) a component consisting of ethoxylated alcohol molecules that can be produced by condensing ethylene oxide with primary straight chain alcohols having from about 40 to about 60 carbon atoms per molecule and from about 40 to about 62% of their total weight in the portion of each molecule that has the chemical structure ($CH_2$—$CH_2$—O)$_n$, where n is a positive integer, the ratio of the amount of component (A.1.A) to the amount of component (A.1.B) being from about 2.5:1.0 to about 1.0:2.5; and (A.1.C) an inorganic boron containing component selected from the group consisting of boric acid and condensed boric acids and their alkali metal and ammonium salts, in an amount such that the ratio of the total stoichiometric equivalent as $H_3BO_3$ of the boron in this component to the total of the solids content in components (A.1.A) and (A.1.B) is from about 0.10:1.0 to about 0.40:1.0; and, optionally, one or more of:

(A.1.D) an extreme pressure and corrosion resistant additive component;

(A.1.E) a component of dispersed and/or dissolved solid lubricant, exclusive of inorganic boron containing materials; and (A.1.F) a component selected from solid and liquid hydrocarbons, wherein at least part of each of components (A.1.A) and (A.1.B) is present in a chemical form other than esters formed by reaction with each other.

8. An aqueous liquid composition according to claim 2, wherein the total solids concentration is from about 3 to about 40%, the pH value is from about 7.5 to about 11, and component (A) consists essentially of:

(A.1.A) copolymers of styrene with (i) maleic anhydride, (ii) maleic acid, (iii) salts of maleic acid with ammonia, alkali metal hydroxides, and amines, or (iv) mixtures of any two or more of these, said copolymers having a molar ratio of styrene to maleic moieties in the range from 4:1 to 1:4, an average molecular weight from about 1600 to about 1950, a sufficient number of salt groups to be soluble or dispersible in water, no more than about 12% of units derived from any monomers other than styrene and maleic moieties, and at least 50 mole % of the cations other than hydrogen in the maleic moieties being substituted ammonium cations derived by adding a proton to amines that will dissolve in water to form at least 0.01 M solutions having a pH value of at least about 10; and (A.1.B) a component consisting of ethoxylated alcohol molecules that can be produced by condensing ethylene oxide with primary straight chain alcohols having from about 28 to about 65 carbon atoms per molecule and from about 20 to about 80% of their total weight in the portion of each molecule that has the chemical structure $(CH_2-CH_2-O)_n$, where n is a positive integer, the ratio of the amount of component (A.1.A) to the amount of component (A.1.B) being from about 4:1 to about 1:4; and, optionally, one or more of:

(A.1.C) an inorganic boron containing component;

(A.1.D) an extreme pressure and corrosion resistant additive component;

(A.1.E) a component of dispersed and/or dissolved solid lubricant, exclusive of inorganic boron containing materials; and (A.1.F) a component selected from solid and liquid hydrocarbons, wherein at least part of each of components (A.1.A) and (A.1.B) is present in a chemical form other than esters formed by reaction with each other.

9. An aqueous liquid composition according to claim 1, wherein the total solids concentration is from about 3 to about 40%, the pH value is from about 7.5 to about 11, and component (A) comprises:

(A.1A) copolymers of styrene with (i) maleic anhydride, (ii) maleic acid, (iii) salts of maleic acid with ammonia, alkali metal hydroxides, and amines, or (iv) mixtures of any two or more of these, said copolymers having a molar ratio of styrene to maleic moieties in the range from 4:1 to 1:4, an average molecular weight from about 1600 to about 1950, a sufficient number of salt groups to be soluble or dispersible in water, no more than about 12% of units derived from any monomers other than styrene and maleic moieties, and at least 50 mole % of the cations other than hydrogen in the maleic moieties being substituted ammonium cations derived by adding a proton to amines that will dissolve in water to form at least 0.01 M solutions having a pH value of at least about 10; and (A.1.B) a component consisting of ethoxylated alcohol molecules that can be produced by condensing ethylene oxide with primary straight chain alcohols having from about 28 to about 65 carbon atoms per molecule and from about 20 to about 80% of their total weight in the portion of each molecule that has the chemical structure $(CH_2-CH_2-O)_n$, where n is a positive integer, the ratio of the amount of component (A.1.A) to the amount of component (A.1.B) being from about 4:1 to about 1:4; and, optionally, one or more of:

(A.1.C) an inorganic boron containing component;

(A.1.D) an extreme pressure and corrosion resistant additive component;

(A.1.E) a component of dispersed and/or dissolved solid lubricant, exclusive of inorganic boron containing materials; and (A.1.F) a component selected from solid and liquid hydrocarbons, wherein at least part of each of components (A.1.A) and (A.1.B) is present in a chemical form other than esters formed by reaction with each other.

10. An aqueous liquid composition according to claim 1, wherein component (A) comprises:

(A.1.A) copolymers of styrene with (i) maleic anhydride, (ii) maleic acid, (iii) salts of maleic acid with ammonia, alkali metal hydroxides, and amines, or (iv) mixtures of any two or more of these, said copolymers containing a sufficient number of salt groups to be soluble and/or dispersible in water; and (A.1.B) a component consisting of ethoxylated alcohol molecules; and, optionally, one or more of:

(A.1.C) an inorganic boron containing component;

(A.1 D) an extreme pressure and corrosion resistant additive component;

(A.1.E) a component of dispersed and/or dissolved solid lubricant, exclusive of inorganic boron containing materials; and (A.1.F) a component selected from solid and liquid hydrocarbons, wherein at least part of each of components (A.1.A) and (A.1.B) is present in a chemical form other than esters formed by reaction with each other.

11. A process of cold working a metal object, comprising steps of (i) applying an aqueous liquid lubricant composition to the surfaces of the metal object that are to be contacted with another hard surface during cold working so as to form a liquid coating on said surfaces of the metal object, (ii) drying the liquid coating formed in step (i) to form a solid coating on said surfaces of the metal object, and (iii) cold working the metal object, wherein the improvement comprises using as the aqueous liquid lubricant composition a composition according to claim 10.

12. An aqueous liquid composition according to claim 6, wherein the total solids content is from about 6.0 to about 20%, the pH value is from about 8.0 to about 8.5, and component (A) consists essentially of:

(A.2.A) an at least partially neutralized film forming copolymer of ethylene and acrylic acid, wherein the fraction of the mass of the copolymer made up of ethylene residues is from about 65 to 94%, the fraction of the mass of the copolymer made up of acrylic acid residues is from about 6 to about 40%, and the fraction of acrylic acid residues that are neutralized is at least about 85%;

(A.2.B) a component consisting of ethoxylated alcohol molecules that can be produced by condensing ethylene oxide with primary straight chain alcohols having from about 40 to about 60 carbon atoms per molecule and from about 40 to about 62% of their total weight in the portion of each molecule that has the chemical structure $(CH_2-CH_2-O)_n$, where n is a positive integer, the ratio of the amount of component (A.2.A) to the amount of component (A.2.B) being from about 1.0:1.5 to about 1.50:1.0; and, optionally, (A.2.C) an inorganic boron containing component selected from the group consisting of boric acid and condensed boric acids and their alkali metal and ammonium salts.

13. An aqueous liquid composition according to claim 12, wherein the total solids concentration is from about 8.9 to about 15.5%, the pH value is from about 8.0 to about 8.5, and component (A) consists essentially of:

(A.2.A) an at least partially neutralized film forming copolymer of ethylene and acrylic acid, wherein the fraction of the mass of the copolymer made up of ethylene residues is from about 79 to about 92%, the fraction of the mass of the copolymer made up of acrylic acid residues is from about 8 to about 21%, and the fraction of acrylic acid residues that are neutralized is at least about 92%, with the counterions being selected from the group consisting of magnesium, zinc, calcium, and alkali metal ions;

(A.2.B) a component consisting of ethoxylated alcohol molecules that can be produced by condensing ethylene oxide with primary straight chain alcohols having from about 48 to about 52 carbon atoms per molecule and from about 48 to about 51% of their total weight in the portion of each molecule that has the chemical structure $(CH_2-CH_2-O)_n$, where n is a positive integer, the ratio of the amount of component (A.2.A) to the amount of component (A.2.B) being from about 1.0:1.20 to about 1.20:1.0; and (A.2.C) boric acid and borax in an amount such that the ratio of the total stoichiometric equivalent as $H_3BO_3$ of the boron in this component to the total of the solids content in components (A.2.A) and (A.2.B) is from about 0.14:1.0 to about 0.20:1.0.

14. An aqueous liquid composition according to claim 3, wherein the total solids content is from about 6.0 to about 20%, the pH value is from about 7.5 to about 9.0, and component (A) consists essentially of:

(A.2.A) an at least partially neutralized film forming copolymer of ethylene and acrylic acid, wherein the fraction of the mass of the copolymer made up of ethylene residues is from about 60 to about 96%, the fraction of the mass of the copolymer made up of acrylic acid residues is from about 4 to about 40%, and the fraction of acrylic acid residues that are neutralized is at least about 85%;

(A.2.B) a component consisting of ethoxylated alcohol molecules that can be produced by condensing ethylene oxide with primary straight chain alcohols having from about 40 to about 60 carbon atoms per molecule and from about 35 to about 70% of their total weight in the portion of each molecule that has the chemical structure $(CH_2-CH_2-O)_n$, where n is a positive integer, the ratio of the amount of component (A.2.A) to the amount of component (A.2.B) being from about 1.0:2.0 to about 2.0:1.0; and, optionally, (A.2.C) a boron containing inorganic acid or salt.

15. An aqueous liquid composition according to claim 2, wherein the total solids content is from about 6.0 to about 25%, the pH value is from about 7 to about 10, and component (A) comprises:

(A.2.A) an at least partially neutralized film forming copolymer of an alkylene having not more than 4 carbon atoms per molecule and an acrylic or alkyl substituted acrylic acid having not more than 4 carbon atoms per molecule, wherein the fraction of the mass of the copolymer made up of alkylene residues is from about 60 to 96%, the fraction of the mass of the copolymer made up of acrylic or alkyl substituted acrylic acid residues is from about 4 to about 40%, and the fraction of acrylic or alkyl substituted acrylic acid residues that are neutralized is at least about 85%;

(A.2.B) an alkoxylated alcohol film forming component of molecules selected from the group consisting of molecules having a chemical structure that can be produced by condensing an alkylene oxide with primary straight chain aliphatic alcohols having only one hydroxyl group and from about 40 to about 60 carbon atoms per molecule and from about 35 to about 70% of their total mass in the oxyalkylene units; and, optionally, (A.2.C) a boron containing inorganic acid or salt.

16. An aqueous liquid composition according to claim 1, wherein the total solids content is from about 6.0 to about 25%, the pH value is from about 7 to about 10, and component (A) comprises:

(A.2.A) an at least partially neutralized film forming copolymer of an alkylene having not more than 4 carbon atoms per molecule and an acrylic or alkyl substituted acrylic acid having not more than 4 carbon atoms per molecule, wherein the fraction of the mass of the copolymer made up of alkylene residues is from about 60 to 96%, the fraction of the mass of the copolymer made up of acrylic or alkyl substituted acrylic acid residues is from about 4 to about 40%, and the fraction of acrylic or alkyl substituted acrylic acid residues that are neutralized is at least about 85%;

(A.2.B) an alkoxylated alcohol film forming component of molecules selected from the group consisting of molecules having a chemical structure that can be produced by condensing an alkylene oxide with primary straight chain aliphatic alcohols having only one hydroxyl group and from about 40 to about 60 carbon atoms per molecule and from about 35 to about 70% of their total mass in the oxyalkylene units; and, optionally, (A.2.C) a boron containing inorganic acid or salt.

17. An aqueous liquid composition according to claim 1, wherein component (A) comprises:

(A.2.A) an at least partially neutralized film forming copolymer of an alkylene and an acrylic acid ("ionomer");

(A.2.B) an alkoxylated alcohol film forming component; and, optionally, (A.2.C) a boron containing inorganic acid or salt.

18. A process of cold working a metal object, comprising steps of (i) applying an aqueous liquid lubricant composition to the surfaces of the metal object that are to be contacted with another hard surface during cold working so as to form a liquid coating on said surfaces.of the metal object, (ii) drying the liquid coating formed in step (i) to form a solid coating on said surfaces of the metal object, and (iii) cold working the metal object, wherein the, improvement comprises using as the aqueous liquid lubricant composition a composition according to claim 17 wherein said component B is selected from the group consisting of benzotriazole, tolyltriazole, and mixtures thereof, and wherein: (i) the concentration of component (B) is from about 400 ppm to about 5000 ppm, (ii) the concentration of component (C) is from about 30 ppm to about 300 ppm, (iii) component (C) is selected from the group consisting of mercaptobenzothiazole and mercaptobenzimidazole, and (iv) the ratio of the concentration of component (C) to the concentration of component (B) is from about 0.007:1.0 to about 0.1:1.0.

* * * * *

UNITED STATES PATENT AND TRADEMARK OFFICE
CERTIFICATE OF CORRECTION

PATENT NO.   : 6,248,701 B1                                               Page 1 of 1
DATED        : June 19, 2001
INVENTOR(S)  : Church It is certified that error appears in the above-identified patent and that said Letters Patent is hereby corrected as shown below:

Column 11,
Line 48, "treated", delete ";", and insert therefor -- , -- and after "both", insert -- ; --.

Column 16,
Line 56, delete "claim 6", and insert therefor -- claim 4 --.

Column 18,
Line 63, after "surfaces", delete ".".

Signed and Sealed this

Seventh Day of October, 2003

JAMES E. ROGAN
*Director of the United States Patent and Trademark Office*